C. J. THORP.
BOTTLE CLOSURE.
APPLICATION FILED SEPT. 12, 1913.
1,115,616.
Patented Nov. 3, 1914.
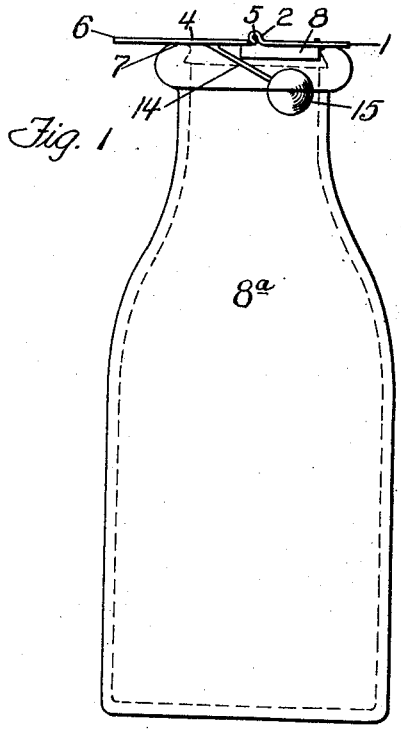
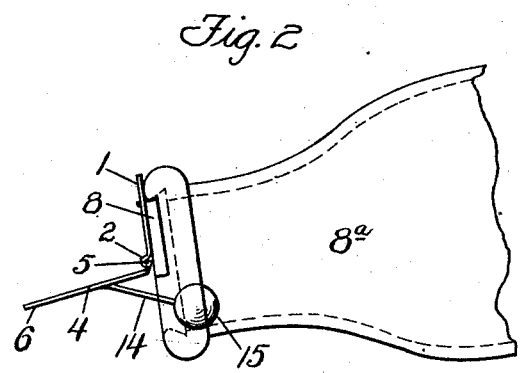
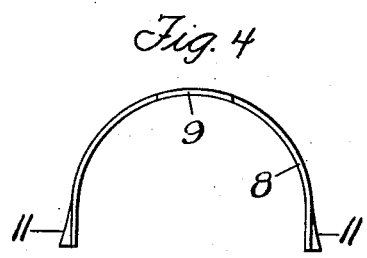
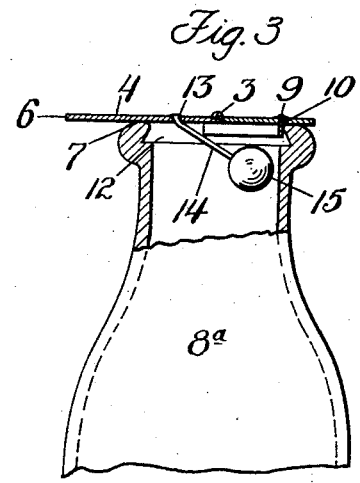
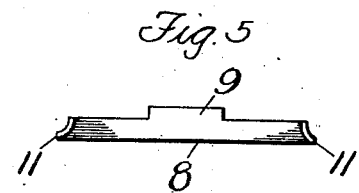
Witnesses
Dowling Langdon
Karl H. Butler
Inventor
Charles J. Thorp,
By
Attorney

UNITED STATES PATENT OFFICE.

CHARLES J. THORP, OF DETROIT, MICHIGAN.

BOTTLE-CLOSURE.

1,115,616. Specification of Letters Patent. Patented Nov. 3, 1914.

Application filed September 12, 1913. Serial No. 789,403.

*To all whom it may concern:*

Be it known that I, CHARLES J. THORP, a citizen of the United States of America, residing at Detroit, in the county of Wayne and State of Michigan, have invented certain new and useful Improvements in Bottle-Closures, of which the following is a specification, reference being had therein to the accompanying drawings.

This invention relates to bottle closures especially designed for milk bottles and similar receptacles.

The primary object of my invention is to provide a simple and inexpensive device for temporarily closing a milk bottle to maintain the contents thereof in a sanitary condition.

A further object of my invention is to provide a durable closure that can be detachably mounted upon a milk bottle and used temporarily in lieu of the ordinary cap or pasteboard disk.

I attain the above objects by a device that has been primarily designed for the use of housewives and cooks to close milk bottles after the ordinary caps have been removed. The device has a novel gravity closing lid that permits of milk being removed from a bottle or the bottle used similar to a cream pitcher. The device prevents flies and insects from contaminating the contents of the bottle, yet permits of the ready removal of the contents and a thorough clearing of the bottle. The device can be distributed by milk dealers as an advertisement and safely used without said device affecting the contents of a bottle.

The device will be hereinafter specifically described and then claimed, and reference will now be had to the drawing wherein:—

Figure 1 is a side elevation of a milk bottle provided with the closure; Fig. 2 is a similar view of a portion of the same, showing the lid in an open position; Fig. 3 is a vertical sectional view of the device; Fig. 4 is a plan of a detached clamping member, and Fig. 5 is a front elevation of the same.

A device in accordance with my invention comprises a semi-circular plate 1 that has the straight edge thereof provided with longitudinal spaced barrels 2 and alining with said barrels are barrels 3, carried by the straight edge of a lid 4. The barrels 2 and 3 are held in alinement by a pivot pin 5, said barrels and said pin constituting a conventional form of hinge for tiltably supporting the lid 4. The lid 4 has a lip 6 whereby it can be manually opened and the marginal edges of the plate 1 and the lid 4 are adapted to extend over the upper or pouring edges 7 of a bottle $8^a$, upon which the device is detachably mounted.

To hold the device in position on the mouth of a bottle, I use a clamping member best shown in Figs. 3 to 5 inclusive. The member comprises a resilient V-shaped strap or spring 8 and intermediate the ends of said spring is a vertically curved lug or rib 9 which is mounted in a curved slot 10 provided therefor in the plate 1, contiguous to the rear or curved edge thereof. The rib 9 is soldered or otherwise secured in the slot 10 and in some instances the upper edge of the rib can be upset or riveted to retain the spring 8 in engagement with the lid.

The ends of the spring 8 extend beneath the hinge of the lid 4 and are at a tangent relative to the body of the spring, whereby it will be necessary to retract or compress the ends of the spring in order to place the clamping member in the mouth of the bottle. To facilitate this operation the ends of the spring are flared or beveled, as at 11 whereby they can be easily sprung inwardly without injury to the bottle. The clamping member is of less depth than the ordinary cap seat 12 of the bottle and is adapted to frictionally engage the walls of said seat and hold the device against accidental displacement when the bottle is tilted.

The lid 4 is provided near its hinged edge with an opening 13 and soldered or otherwise mounted in said opening is the upper end of an angularly disposed opening and closing member in the form of an arm 14 that in its normal position shown in Figs. 1 and 3, extends rearwardly below the plate 1 and has a weight 15 to counter balance and hold the lid 4 in a closed position. When the bottle is tilted, as shown in Fig. 2, the weighted arm 14 opens the lid 4, said lid being limited in its movement by the weight 15 contacting with the wall of the bottle.

I attach considerable importance to the fact that the pouring edges of the bottle are protected by the edges of the device, consequently there is little danger of the contents of a bottle being polluted by filth or other foreign matter accumulating upon the edges of the bottle.

One embodiment of my invention has been illustrated, but it is to be understood that the structural elements are susceptible to such changes as fall within the scope of the appended claim.

What I claim is:—

The combination with a milk bottle, of a plate, a hinge lid carried thereby and cooperating with said plate in covering the pouring edges of the mouth of said bottle, a lip forming part of said lid and projecting laterally therefrom, an angularly disposed weighted arm having the upper end thereof riveted in said lid and the lower weighted end extending into said bottle and under said plate and adapted to hold said lid normally closed, and a resilient U-shaped clamping member having an oblong curved lug riveted in said plate to retain the edges of said member against said plate, said member having the lower edges thereof at its ends flared whereby said member can be easily sprung into the mouth of said bottle and frictionally held therein.

In testimony whereof I affix my signature in presence of two witnesses.

CHARLES J. THORP.

Witnesses:
ANNA M. DORR,
LEWIS E. FLANDERS.

Copies of this patent may be obtained for five cents each, by addressing the "Commissioner of Patents, Washington, D. C."